(12) United States Patent
Mclean

(10) Patent No.: US 11,221,229 B1
(45) Date of Patent: Jan. 11, 2022

(54) AUTONOMOUS VEHICLE ROUTING BASED ON PREDICTED LOCATION OF A DISRUPTIVE THIRD-PARTY VEHICLE

(71) Applicant: GM Cruise Holdings LLC, San Francisco, CA (US)

(72) Inventor: Brayden Scott Mclean, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 283 days.

(21) Appl. No.: 16/359,975

(22) Filed: Mar. 20, 2019

(51) Int. Cl.
    *G01C 21/34*     (2006.01)
    *G05D 1/00*     (2006.01)
    *G05D 1/02*     (2020.01)
    *G01C 21/36*     (2006.01)

(52) U.S. Cl.
    CPC ..... *G01C 21/3492* (2013.01); *G01C 21/3691* (2013.01); *G05D 1/0088* (2013.01); *G05D 1/0212* (2013.01); *G05D 1/0291* (2013.01); *G05D 2201/0212* (2013.01)

(58) Field of Classification Search
    CPC ............ G01C 21/3492; G01C 21/3691; G05D 1/0088; G05D 1/0212; G05D 1/0291
    See application file for complete search history.

(56) References Cited

U.S. PATENT DOCUMENTS

| | | |
|---|---|---|
| 6,683,541 B2 | 1/2004 | Staggs et al. |
| 8,253,564 B2 | 8/2012 | Lee et al. |
| 8,812,018 B2 | 8/2014 | Cooper et al. |
| 2017/0103571 A1 | 4/2017 | Beaurepaire |
| 2018/0276485 A1* | 9/2018 | Heck ................... G05D 1/0088 |
| 2018/0283895 A1* | 10/2018 | Aikin ................... G08G 1/0104 |
| 2019/0359205 A1* | 11/2019 | Xu ....................... G05D 1/0253 |

* cited by examiner

*Primary Examiner* — Thomas G Black
*Assistant Examiner* — Tarek Elarabi
(74) *Attorney, Agent, or Firm* — Medley, Behrens & Lewis, LLC

(57) ABSTRACT

Various technologies described herein relate to routing an autonomous vehicle based upon likelihood of interacting with a disruptive third-party vehicle. A computing system receives an origin location of an autonomous vehicle and a destination location of the autonomous vehicle. The computing system identifies a route for the autonomous vehicle to take based upon output of a computer-implemented model. The computer-implemented model is generated based upon labeled data that is indicative of observed instances of a disruptive third-party vehicle exhibiting behavior that impacts operation of an autonomous vehicle. The output of the computer-implemented model is a score that is indicative of a likelihood that the disruptive third-party vehicle will be traveling through a geographic location along a candidate route at a certain time. The score is used in part to identify the route from amongst a plurality of candidate routes. The autonomous vehicle then travels along the route.

20 Claims, 8 Drawing Sheets

AUTONOMOUS VEHICLE ROUTING BASED ON PREDICTED LOCATION OF A DISRUPTIVE THIRD-PARTY VEHICLE

BACKGROUND

An autonomous vehicle is a motorized vehicle that can operate without a human driver. Conventionally, autonomous vehicles tend to be routed from an origin location to a destination location based upon ad-hoc factors that minimize travel time and/or travel distance from the origin location to the destination location. Autonomous vehicles may also be routed based on operational factors such as distance to or from a charging station and/or a gas station. However, if such operational factors are the only ones considered, the resulting route might not be optimal from other perspectives, as other factors may also be important in generating a route for an autonomous vehicle to follow from the origin location to the destination location.

For instance, an autonomous vehicle conventionally may be routed without consideration of whether it may encounter a vehicle on the road that can detrimentally impact travel of the autonomous vehicle. Thus, a route may be selected for an autonomous vehicle such that the autonomous vehicle is to be in a geographic region at a particular time; during the particular time, another vehicle may also be in the geographic region and may detrimentally impact the autonomous vehicle (e.g., by making frequent stops, speeding, driving slowly, driving erratically, etc.).

SUMMARY

The following is a brief summary of subject matter that is described in greater detail herein. This summary is not intended to be limiting as to scope of the claims.

Described herein are various technologies pertaining to routing an autonomous vehicle based upon a likelihood of interacting with a disruptive third-party vehicle potentially traveling through a geographic location at a certain time. A disruptive third-party vehicle can be a vehicle on a road that can detrimentally impact other vehicles on the road (e.g., a disruptive third-party vehicle can be a slow moving vehicle relative to a speed limit, a fast moving vehicle relative to a speed limit, a vehicle that frequently swerves or changes lanes, a vehicle that makes frequent stops at locations other than at stop signs, stop lights, or the like). More specifically, described herein is a computer-implemented model that is configured to output a score that is indicative of a likelihood of the disruptive third-party vehicle traveling through a geographic region during a given period of time. The geographic region can be along a candidate route (e.g., for the autonomous vehicle) from an origin location to a destination location. Moreover, the given period of time can be a period of time during which the autonomous vehicle may travel through the geographic region if following the candidate route. The autonomous vehicle (or a separate computing system) may identify a route for the autonomous vehicle to follow from the origin location to the destination location based in part upon the score. Further, the autonomous vehicle may follow the route from the origin location to the destination location.

A computing system can receive information specifying an origin location of an autonomous vehicle and a destination location of the autonomous vehicle. In one example, the autonomous vehicle can comprise the computing system. In another example, the computing system is separate from the autonomous vehicle (e.g., a server computing system).

According to various embodiments, a plurality of different candidate routes from the origin location to the destination location may be generated and the computing system can identify the route from the plurality of candidate routes. The computing system can identify the route for the autonomous vehicle to follow based upon output of the computer-implemented model. The computing system (or another computing system) can generate the computer-implemented model based upon labeled data indicative of observed instances of the disruptive third-party vehicle exhibiting behavior that impacts operation of an autonomous vehicle. The instances can be observed by one or more autonomous vehicles that are part of a fleet of autonomous vehicles. According to an example, the computing system can further generate a predicted route of the disruptive third-party vehicle based on the observed instances of the disruptive third-party vehicle.

The autonomous vehicle can include a vehicle propulsion system, a braking system, and a steering system. According to the example where the autonomous vehicle comprises the computing system, the computing system can be in communication with the vehicle propulsion system, the braking system, and/or the steering system to move the autonomous vehicle along the route. Alternatively, pursuant to the example where the computing system is separate from the autonomous vehicle, the identified route can be transmitted to the autonomous vehicle and a computing system within the autonomous vehicle can control the vehicle propulsion system, the braking system, and/or the steering system to move the autonomous vehicle along the route.

The above-described technologies present various advantages over conventional computer-implemented routing approaches for autonomous vehicles. For instance, unlike conventional approaches of routing an autonomous vehicle based on time or distance factors regardless of the presence of disruptive third-party vehicles, the technologies set forth herein enable balancing presence of a disruptive third-party vehicle with other routing factors (e.g., travel time, travel distance, etc.); thus, a route for an autonomous vehicle can be selected based at least in part on a predicted schedule of a disruptive third-party vehicle (e.g., the route for the autonomous vehicle can avoid times and locations at which the disruptive third-party vehicle is more likely to be encountered). Moreover, the approaches described herein can be used to predict a route of a disruptive third-party vehicle based on autonomous vehicle interaction with the disruptive third-party vehicle.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
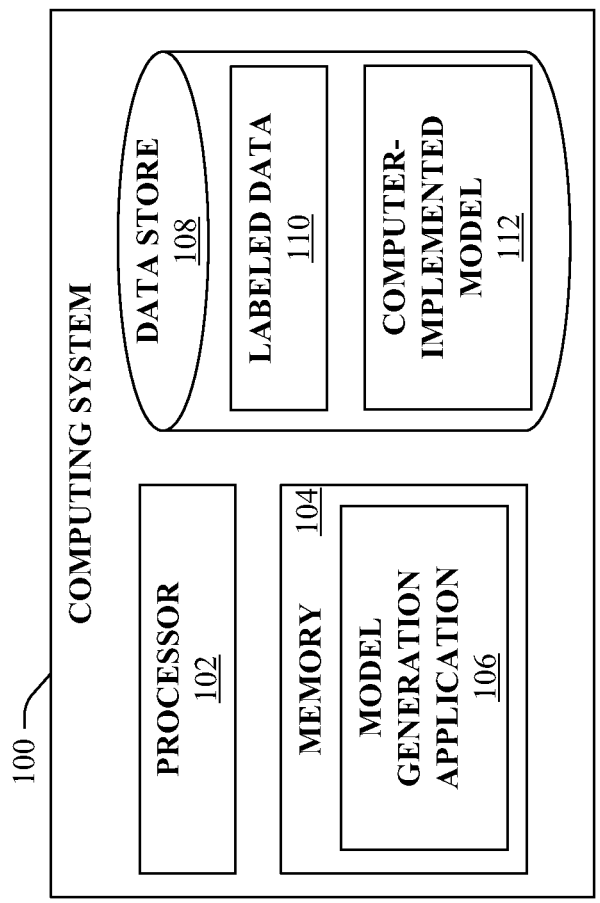
FIG. 1 illustrates an exemplary computing system configured to generate a computer-implemented model for predicting locations of disruptive third-party vehicles in an environment.

Various technologies pertaining to routing an autonomous vehicle based upon predicted locations of disruptive third-party vehicles over time are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", and "application" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Moreover, the term "labeled data" is intended to cover training data that is labeled by a user and/or data signifying an observation made by an autonomous vehicle and/or other observation systems (e.g., stationary traffic cameras) which may not be labeled by a user and/or confirmed by a user.

Disclosed are various technologies that generally relate to routing an autonomous vehicle based upon a likelihood of interacting with a disruptive third-party vehicle potentially traveling through a geographic location at a certain time. A computer-implemented model may be generated based upon labeled data indicative of observed instances of the disruptive third-party vehicle exhibiting behavior that impacts and/or is anticipated to impact operation of an autonomous vehicle. The instances may be observed by an autonomous vehicle and/or other observation systems (e.g., stationary traffic cameras). The computer-implemented model then outputs a score that indicates a likelihood that the disruptive third-party vehicle will be traveling through a geographic area at a similar time as the autonomous vehicle. This score can then be used to identify a route from a plurality of candidate routes for the autonomous vehicle to follow from an origin location to a destination location.

With reference now to FIG. 1, illustrated is an exemplary computing system 100 configured to generate a computer-implemented model 112 for predicting locations of disruptive third-party vehicles in an environment. The computing system 100 includes a processor 102 and memory 104 that includes computer-executable instructions that are executed by the processor 102. The memory 104 includes a model generation application 106 that is configured to generate computer-implemented models, as will be described in detail below.

The computing system 100 further includes a data store 108. The data store 108 includes labeled data 110. The labeled data 110 can include data indicative of observed instances of a disruptive third-party vehicle exhibiting behavior that impacts operation of a vehicle (e.g., an autonomous vehicle, a human driven vehicle). A disruptive third-party vehicle can be a vehicle on a road that can detrimentally impact other vehicles on the road (e.g., a disruptive third-party vehicle can be a slow moving vehicle relative to a speed limit, a fast moving vehicle relative to a speed limit, a vehicle that frequently swerves or changes lanes, a vehicle that makes frequent stops at locations other than at stop signs, stop lights, or the like). Additionally, or alternatively, the labeled data 110 can include data indicative of predicted routes taken by the disruptive third-party vehicle, as will be described in detail. While many of the examples set forth herein describe one disruptive third-party vehicle, it is contemplated that these examples can be extended to scenarios that include multiple disruptive third-party vehicles (e.g., multiple third-party vehicles can be observed, tracked, and considered when routing an autonomous vehicle).

The observed instances of the behavior of the disruptive third-party vehicle can include actions taken by the disruptive third-party vehicle that detrimentally impact operation of an autonomous vehicle. For instance, the behavior can include traveling at a speed above a threshold speed for a geographic region (e.g., the threshold speed can be above a speed limit for the geographic region, speeding 15 miles per hour above a speed limit for the geographic region). According to another example, the behavior can include traveling at a speed below a threshold speed for a geographic region (e.g., the threshold speed can be below a speed limit, traveling 15 miles per hour below a speed limit for the geographic region). In another example, the behavior can include a number of lane changes above a threshold number of lane changes during a period of time (e.g., swerving). In a further example, the behavior can include the disruptive third-party vehicle frequently stopping at locations other than stop signs, stop lights, or the like. For instance, a disruptive third-party vehicle can frequently stop to make pickups and/or deliveries. The disruptive third-party vehicle can make multiple stops along a section of roadway to make deliveries and/or pickups, e.g. a bus, a mail truck, a garbage truck, etc. Alternatively, a plurality of disruptive third-party vehicles can share a similar geographic stopping location, e.g. rider pickup outside an office building or sports stadium. In a yet further example, the behavior can include blocking an intersection. For instance, the disruptive third-party vehicle can enter an intersection and not travel all the way through preventing cross-traffic movement. In another example, the behavior can include not complying with posted traffic signs, e.g., not stopping at a stop sign.

Information indicative of observed instances of the disruptive third-party vehicle exhibiting behavior that impacts operation of the autonomous vehicle is stored in the data store 108 as the labeled data 110. While the labeled data 110 can include instances of the behavior for a particular disruptive third-party vehicle tracked over time, a portion of personally identifiable information of the particular disruptive third-party vehicle is anonymized. For example, a color and/or model of the disruptive third-party vehicle (e.g., red car of a specific make and model) may be stored as part of the labeled data 110, while other personally identifiable information (e.g., license plate) will be anonymized. In another example, all portions are anonymized and thus, personally identifiable information is not stored as part of the labeled data 110. It is contemplated herein that the identifiable information stored as part of the labeled data 110 is generally indicative of a particular color, model and/or make of the disruptive third-party vehicle and accordingly, privacy of disruptive third-party vehicles is maintained in the techniques set forth herein.

The data store 108 also includes the computer-implemented model 112 generated by the model generation application 106 based upon the labeled data 110. The computer-implemented model 112 may be a computer-implemented machine learning model. The computer-implemented model 112 is configured to output a likelihood that any specific disruptive third-party vehicle will be traveling through a geographic location at a certain time. The geographic location can be located along a route from an origin location to a destination location that a vehicle follows (e.g., along a route for an autonomous vehicle).

In an embodiment, the computer-implemented model 112 may be or include a mixed effects model. In another embodiment, the computer-implemented model 112 may be or include a Bayesian hierarchical model, a random forest model, or a neural network model. When the computer-implemented model 112 is a neural network model, the neural network model may be or include an artificial neural network (ANN) model, a deep neural network (DNN) model, a convolutional neural network (CNN) model, a recurrent neural network (RNN) model, or another suitable neural network model.

The likelihood the disruptive third-party vehicle will be traveling through a geographic location at a certain time may be influenced by one or more different factors. For instance, the likelihood may be influenced by the number of observed instances of a specific vehicle exhibiting similar behavior in a similar geographic location at a similar time. For example, a third-party vehicle that was frequently observed (e.g., ten) speeding compared to a number of instances being observed not speeding along a similar stretch of road at a similar time may have a higher likelihood of speeding through the stretch of road at similar times in the future. In contrast, a third-party vehicle that was observed driving at a posted speed limit along a similar stretch of road at a similar time may have a lower likelihood of speeding through the stretch of road at similar times in the future. In a further example, the likelihood may be influenced based on a recently observed location of a previously identified disruptive third-party vehicle. For instance, where a previously identified disruptive third-party vehicle was recently observed driving through a specific location, the likelihood the third-party vehicle will be traveling through another particular location a threshold distance away may be low.

In another example, the likelihood may be influenced by recency of the observation. For instance, where the observation of the third-party vehicle was recent (e.g., one or two days ago) the likelihood may be higher than for an older observation.

In a yet further example, the likelihood may be influenced by class of the third-party vehicle. Certain classes of third-party vehicles may have a high chance of repeated patterns of behavior. For instance, a bus may have a repeated pattern of stopping at a similar location at a similar time of day.

In a further example, the likelihood may be influenced by the type of behavior observed. For instance, repeated starting and stopping may have a higher likelihood of being repeated than other types of behavior. In another example, the likelihood may be influenced by a weather condition (e.g., rainy, sunny, snowy, etc.). In yet another example, the likelihood may be influenced by whether it is a weekday or a weekend day and/or other time of day factors. In a yet further example, the likelihood may be influenced by a location itself. For instance, a location where multiple different third-party vehicles have been observed operating in a disruptive manner (e.g., outside a sports arena, school pickup zone, etc.) may have a higher likelihood that a third-party vehicle operating at that location is operating disruptively.

It is contemplated that the above described factors that may influence likelihood are non-limiting and other unspecified factors may influence the likelihood of presence of a disruptive third-party vehicle.

Operation of the computing system 100 is now set forth. The computing system 100 stores the labeled data 110, which is described in detail below. The model generation application 106 accesses the labeled data 110 from the data store 108. The model generation application 106 then generates the computer-implemented model 112 based upon the labeled data 110. Subsequent to generating the computer-implemented model 112, the model generation application 106 may update the computer-implemented model 112 when additional labeled data 110 is received by the computing system 100. Although the model generation application 106 has been described as generating a single computer-implemented model, it is to be understood that the model generation application 106 may generate a plurality of different computer-implemented models.

The labeled data 110 may be provided by any suitable source. For instance, the computing system 100 may receive observation data from one or more autonomous vehicles indicative of observed behavior, of the type described above, of a disruptive third-party vehicle.

The computer-implemented model 112 can model a schedule and location of a disruptive third-party vehicle over time. Thus, a common driving schedule of the disruptive third-party vehicle can be learned through repeated observation; such information can be utilized when generating a route for an autonomous vehicle, such that the autonomous vehicle can be routed to mitigate concurrently being in geographic regions where the autonomous vehicle is likely to encounter the disruptive third-party vehicle. For instance, a disruptive third-party vehicle may cause unsafe driving conditions (e.g., by excessively speeding, swerving, starting and stopping, driving significantly below the speed limit); thus, an autonomous vehicle can be routed to mitigate encounters with such a disruptive third-party vehicle.

Figure 2:
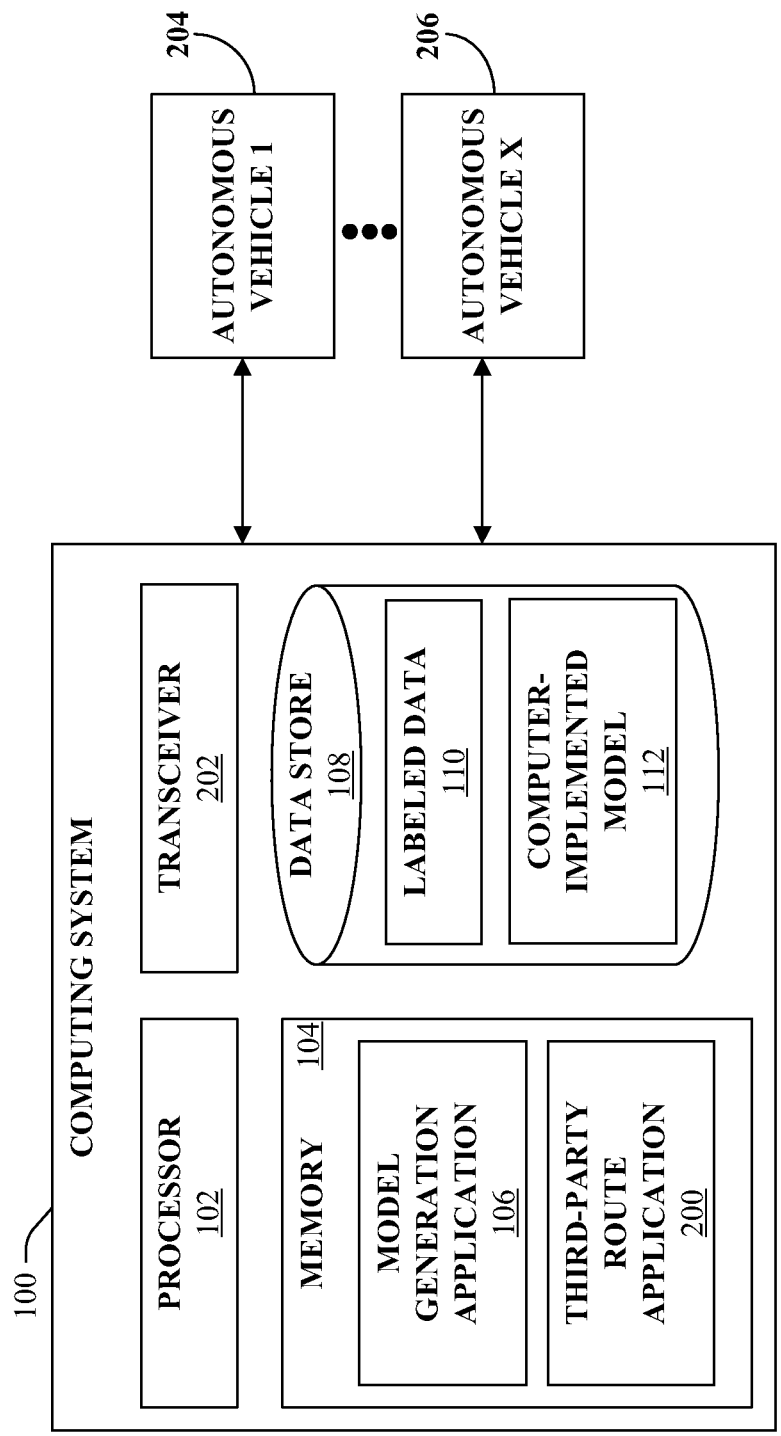
FIG. 2 illustrates another exemplary computing system in communication with an autonomous vehicle.

In an embodiment illustrated in FIG. 2, the computing system 100 is in communication with a plurality of autonomous vehicles, namely, autonomous vehicle 1 204, . . . , and autonomous vehicle X 206 (collectively referred to herein as autonomous vehicles 204-206). The autonomous vehicles 204-206 may be in the same fleet of autonomous vehicles and/or may be part of different fleets of autonomous vehicles.

In order to receive data transmitted from the autonomous vehicles 204-206, the computing system 100 may further include a transceiver 202. The transceiver 202 is configured to transmit data from the computing system 100 and/or receive data at the computing system 100. Thus, the computing system 100 can be in communication with the autonomous vehicles 204-206.

One or more of the autonomous vehicles 204-206 are configured to detect occurrence of the disruptive third-party vehicle behavior described above. Responsive to detecting occurrence of the behavior, the autonomous vehicles 204-206 may be configured to collect observation data about the detected occurrence. The observation data can include one or more geographic location of the autonomous vehicle and/or third-party vehicle, time of detection, travel direction of the third-party vehicle, identifying information of the third-party vehicle, time of day, weather condition(s), behavior type, severity of behavior (e.g., amount of speed over speed limit), class of the third-party vehicle, and/or the like. The identifying information of the third-party vehicle can include anything suitable for distinguishing the third-party vehicle from a plurality of other third-party vehicles, such as make, model, license plate number, vehicle fleet number, identifying features (e.g., bumper stickers, tinted windows), and/or similar identifying features. As noted above, however, a portion of the identifying information is not stored with the behavior data; thus, a portion of the identifying information is not included as part of the labeled data 110 retained in the data store 108.

The observation data may be transmitted from the autonomous vehicles 204-206 to the computing system 100 at any suitable time. For instance, one or more of the autonomous vehicles 204-206 may upload the observation data when the autonomous vehicle is at a dedicated upload location. In another example, responsive to detecting the behavior, the autonomous vehicle can upload the observation data subsequent to recording it. The computing system 100 is further configured to store the observation data (or a portion thereof) in the data store 108 as the labeled data 110.

Accordingly, one or more of the autonomous vehicles 204-206 can drive past a disruptive third-party vehicle and can gather data utilizing sensors of the autonomous vehicle(s) 204-206. Through repeated exposure to the disruptive third-party vehicle by various autonomous vehicles 204-206, the computing system 100 can record and monitor the road position and time of the disruptive third-party vehicle (e.g., every weekday morning between 7:45 am and 7:50 am this disruptive third-party vehicle is commonly detected by one or more of the autonomous vehicles 204-206 on a particular section of a street). This information can be retained as part of the labeled data 110 and can be utilized by the model generation application 106 to derive a common schedule for the disruptive third-party vehicle (while anonymizing the disruptive third-party vehicle). Thus, a prediction for where the disruptive third-party vehicle may be in the future at a specific day of the week or time of day can be made (e.g., utilizing the computer-implemented model 112).

In addition to tracking and recording observed instances of the disruptive third-party vehicle exhibiting behavior that impacts operation of other vehicles, it is contemplated that one or more of the autonomous vehicles 204-206 can augment the foregoing data. For instance, data identifying locations where the disruptive third-party vehicle typically parks (e.g., if visible to camera(s) of the autonomous vehicle(s) 204-206), data specifying the time of day, day of week, etc. that the disruptive third-party vehicle commonly departs its origin or arrives at its destination, or the like can be detected by one or more of the autonomous vehicles 204-206. Accordingly, a time window during which the disruptive third-party vehicle is on the road can be modeled and its route approximated.

Further, pursuant to an example, it is contemplated that the output of the computer-implemented model 112 can be utilized to generate a density map estimating for each road segment at each minute in the future the approximate number of disruptive third-party vehicles and/or an aggregated road safety index score. The foregoing can be utilized as part of a routing algorithm (e.g., by a routing application, as described herein) to mitigate a number of occurrences of an autonomous vehicle being exposed to disruptive third-party vehicles. According to yet another example, it is contemplated that the output of the computer-implemented model 112 can be employed to alert other road users to avoid the predicted locations of the disruptive third-party vehicles.

As illustrated in FIG. 2, the memory 104 can further optionally include a third-party route application 200 configured to generate a predicted route of a disruptive third-party vehicle. The third-party route application 200 can generate the predicted route based on the observation data and/or other stored data. For instance, the other stored data can include information stored by an autonomous vehicle during routine operation. The third-party route application 200 may be configured to use observation data associated with a specific disruptive third-party vehicle to generate predicted route the disruptive third-party vehicle takes based on the time and location of detected observance of the disruptive third-party vehicle. The third-party route application 200 can be configured to interact with a computer implemented machine learning model to generate predicted route of a disruptive third-party vehicle based on the observation data. As will be described in greater detail below, the machine learning model is configured to facilitate generation of a predicted route of a disruptive third-party vehicle based on the observation data. In an embodiment, the machine learning model may be a recurrent neural network (RNN). In yet another embodiment, the machine learning model may be or include a variational autoencoder (VAE).

In an example, the machine learning model may comprise nodes and edges that couple nodes in the machine learning model. For instance, the machine learning model may be an artificial neural network (ANN), a Bayesian model, a deep neural network (DNN), or the like. In another example, the machine learning model may be or include a support vector machine (SVM), a naïve Bayes classifier, or other suitable classifier. When the machine learning model comprises nodes and edges, each edge is assigned a learned weight, wherein the weight can be learned using a supervised, semi-supervised, or unsupervised learning procedure. Accordingly, for instance, a weight assigned to an edge can be influenced by content of the observation data. The third-party route application 200 may provide observation data to the machine learning model as input, and the machine learning model may generate a predicted route based upon the input and the weights assigned to the edges.

Observations made by the autonomous vehicle and/or another observation system can be used to adjust a confidence of the machine learning model. For example, in response to a disruptive third-party vehicle being observed at a first location at a first time the machine learning model may increase the likelihood of the third-party vehicle being at a second location at a second time. Observation of the third-party vehicle at the second location at the second time may increase the confidence of the machine learning model, whereas absence of the third-party vehicle may lower the confidence. In another example, in response to a disruptive third-party vehicle being observed at a specific location at 7:45 a.m. Friday morning the machine learning model may increase the likelihood of the third-party vehicle being at the location at 7:45 a.m. other weekday mornings. Observation of the third-party vehicle at the same location at 7:45 a.m. on the subsequent weekday may increase the confidence of the machine learning model.

The third-party route application 200 can be further configured to store the predicted route in the data store 108. More specifically, the predicted route can be stored in the labeled data 110. The predicted route can be associated with and supplement the corresponding observation data used to generate the predicted route and/or the predicted route can replace the used observation data.

Figure 3:
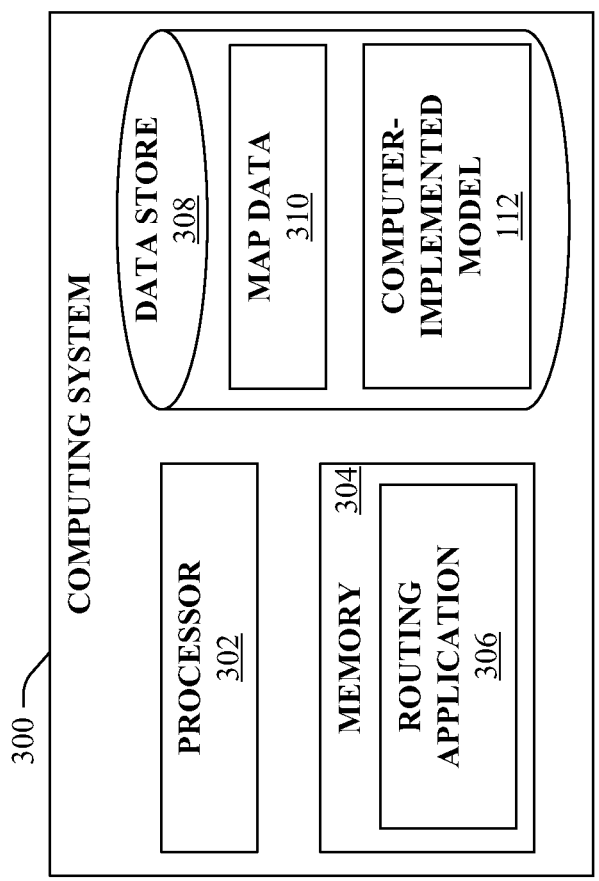
FIG. 3 illustrates a further exemplary computing system.

With reference now to FIG. 3, an exemplary computing system 300 is illustrated. In an embodiment, the computing system 300 may be or include the computing system 100 or the computing system 100 may be or include the computing system 300. The computing system 300 includes a processor 302 and memory 304 that includes computer-executable instructions that are executed by the processor 302. The memory 304 includes a routing application 306 generally configured to identify a route for an autonomous vehicle to follow from an origin location to a destination location, as will be described in greater detail below. The routing application 306 may be configured to identify a route that minimizes interaction of the autonomous vehicle and one or more disruptive third-party vehicle. The routing application 306 may also be configured to identify a route that balances second order effects of the routing decision, travel time, and/or travel distance of the autonomous vehicle along the route with interaction of the autonomous vehicle and one or more disruptive third-party vehicles.

Generally, "second order effects" of a routing decision can include any consequence caused by routing an autonomous vehicle along a specific path. For instance, routing multiple autonomous vehicles such that they share a path portion can result in self-imposed traffic. In an illustrative example, the routing application 306 can consider the second order effect of routing multiple autonomous vehicles along a similar path to avoid a disruptive third-party vehicle and can consider a larger number of candidate routes, as described in detail below, to avoid this second order effect.

The computing system 300 may also include a data store 308. The data store 308 may include map data 310. In general, the map data 310 comprises maps of driving environments of autonomous vehicles. The routing application 306 may identify candidate routes for an autonomous vehicle to follow from an origin location to a destination location based upon the map data 310. The routing application 306 may be further configured to identify a route for the autonomous vehicle from amongst the candidate routes, as will be described in detail below with reference to FIG. 6. The data store 308 may also include the computer-implemented model 112 described above.

Figure 4:
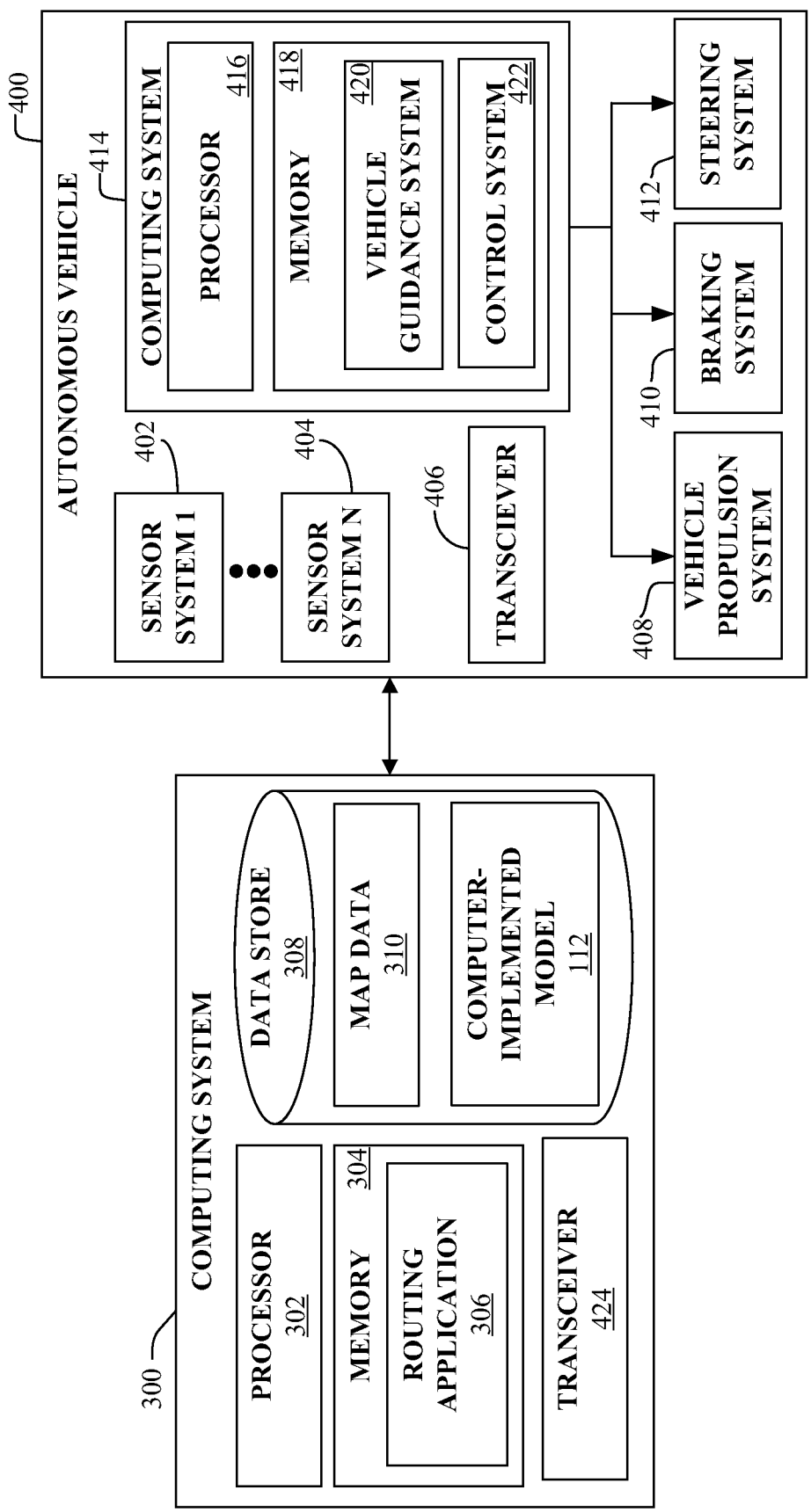
FIG. 4 illustrates an exemplary autonomous vehicle in communication with a computing system.

With reference now to FIG. 4, illustrated is an exemplary autonomous vehicle 400. The autonomous vehicle 400 can navigate about roadways without human conduction based upon sensor signals output by sensor systems of the autonomous vehicle 400. The autonomous vehicle 400 includes a plurality of sensor systems, namely, a sensor system 1 402, . . . , and a sensor system N 404 (collectively referred to herein as sensor systems 402-404). The sensor systems 402-404 are of different types and may be arranged about the autonomous vehicle 400. For example, the sensor system 1 402 may be a lidar sensor system and the sensor system N 404 may be a camera (image) system. Other exemplary sensor systems 402-404 can include radar sensor systems, satellite-based radio navigation sensor systems (e.g., global positioning system (GPS) sensor systems), sonar sensor systems, infrared sensor systems, and the like. The sensor systems 402-404 generate (i.e., output) sensor data. For instance, the radar sensor systems can generate radar sensor data, the lidar sensor systems can generate lidar sensor data, the camera sensor systems can generate camera sensor data, etc.

The autonomous vehicle 400 further includes several mechanical systems that are used to effectuate appropriate motion of the autonomous vehicle 400. For instance, the mechanical systems can include, but are not limited to, a vehicle propulsion system 408, a braking system 410, and a steering system 412. The vehicle propulsion system 408 may be an electric motor, an internal combustion engine, or the like. The braking system 410 can include an engine brake, brake pads, actuators, and/or any other suitable componentry that is configured to assist in decelerating the autonomous vehicle 400. The steering system 412 includes suitable componentry that is configured to control the direction of the movement of the autonomous vehicle 400.

The autonomous vehicle 400 additionally comprises a computing system 414 that is in communication with the sensor systems 402-404, the vehicle propulsion system 408, the braking system 410, and/or the steering system 412. The computing system 414 includes a processor 416 and memory 418 that includes computer-executable instructions that are executed by the processor 416. In an example, the processor 416 can be or include a graphics processing unit (GPU), a plurality of GPUs, a central processing unit (CPU), a plurality of CPUs, an application-specific integrated circuit (ASIC), a microcontroller, or the like.

The memory 418 includes a control system 422 configured to control operation of the vehicle propulsion system 408, the braking system 410, and/or the steering system 412. The memory 418 further includes a vehicle guidance system 420 that may be configured to receive a route from a separate computing system, e.g., the computing system 300, and to set the route for a trip of the autonomous vehicle 400 from an origin location to a destination location. The vehicle guidance system 420 may be further configured to cause the control system 422 to move the autonomous vehicle 400 along the route.

In order to transmit data between the autonomous vehicle 400 and the computing system 300, the autonomous vehicle 400 can further include a transceiver 406. The transceiver 406 is configured to transmit data from the autonomous vehicle 400 and/or receive data at the autonomous vehicle 400. Thus, the autonomous vehicle 400 can be in communication with the computing system 300. Similarly, the computing system 300 can include a transceiver 424 configured to transmit data from the computing system 300 and/or receive data at the computing system 300.

Figure 5:
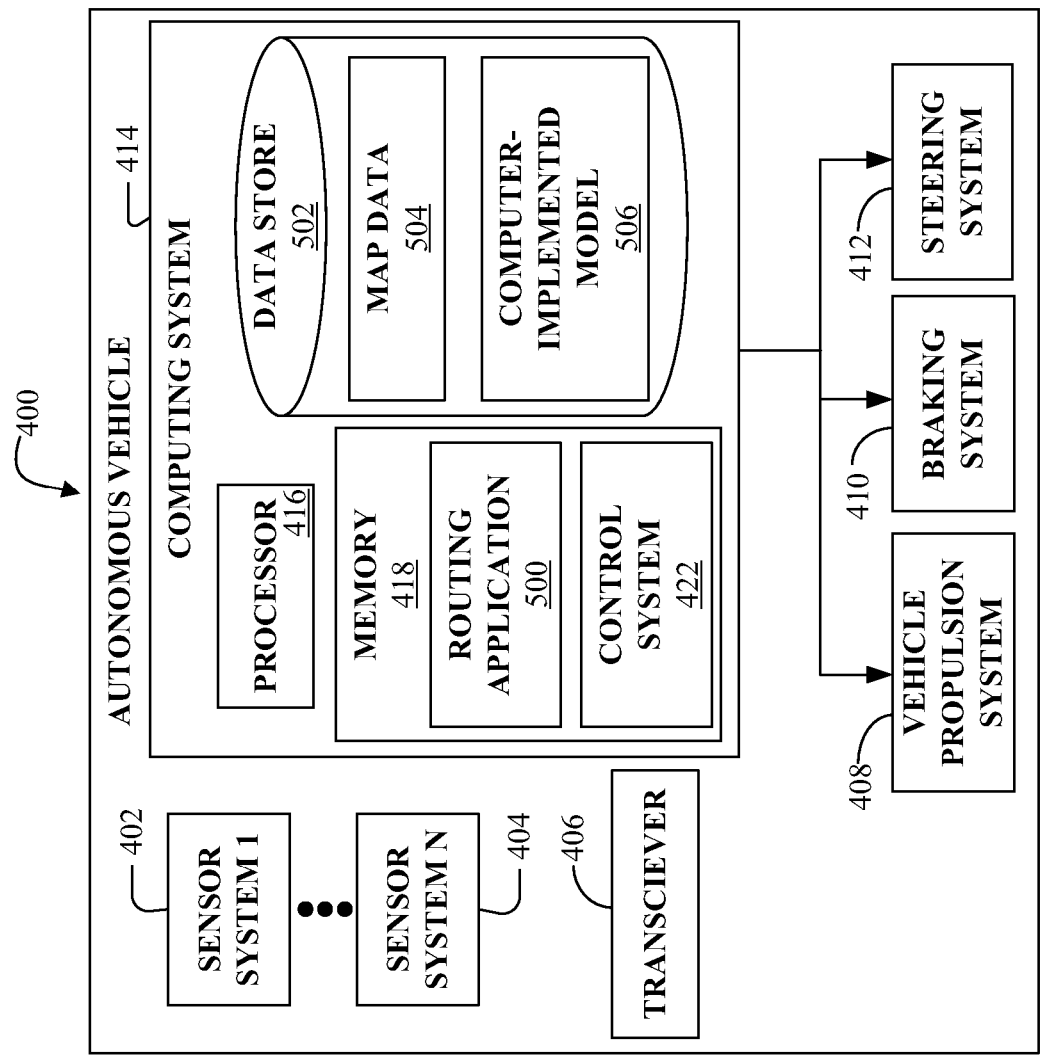
FIG. 5 illustrates another exemplary autonomous vehicle.

In another embodiment, illustrated in FIG. 5, the memory 418 of the autonomous vehicle 400 can include a routing application 500 similar to the routing application 306 described above with reference to FIG. 3. The routing application 500 may be generally configured to identify a route for the autonomous vehicle 400 to follow from an origin location to a destination location. The routing application 500 may be configured to identify a route that minimizes interaction of the autonomous vehicle 400 and one or more detected and/or predicted disruptive third-party vehicles. The routing application 500 may also be configured to identify a route that balances travel time and/or travel distance of the autonomous vehicle 400 along the route with interaction of the autonomous vehicle and one or more detected disruptive third-party vehicles.

The computing system 414 may also include a data store 502. The data store 502 may include map data 504 similar to the map data 310 described in detail above. In general, the map data 504 comprises maps of driving environments of autonomous vehicles. The routing application 500 may identify candidate routes for the autonomous vehicle 400 to follow from an origin location to a destination location based upon the map data 504. The routings application 500 can then identify the route for the autonomous vehicle 400 from amongst the candidate routes, as will be described in detail with reference to FIG. 6. The data store 502 may also include a computer-implemented model 506.

The computer-implemented model 506 may be received from a computing system and then stored internally within the autonomous vehicle 400 in the data store 502. This computer-implemented model 506 may be updated periodically and/or dynamically. For instance, each time a computer-implemented model is generated by the computing system 300, the computer-implemented model can be transmitted to the autonomous vehicle 400 and the autonomous vehicle 400 can store the newly received computer-implemented model replacing the previously stored computer-implemented model 506.

Additionally, or alternatively, the computing system 414 may include components (not pictured) configured to generate the computer-implemented model 506. The components can include those described above with reference to FIG. 1. For instance, the computing system can include a model generation application that uses labeled data to generate the computer-implemented model 506.

Figure 6:
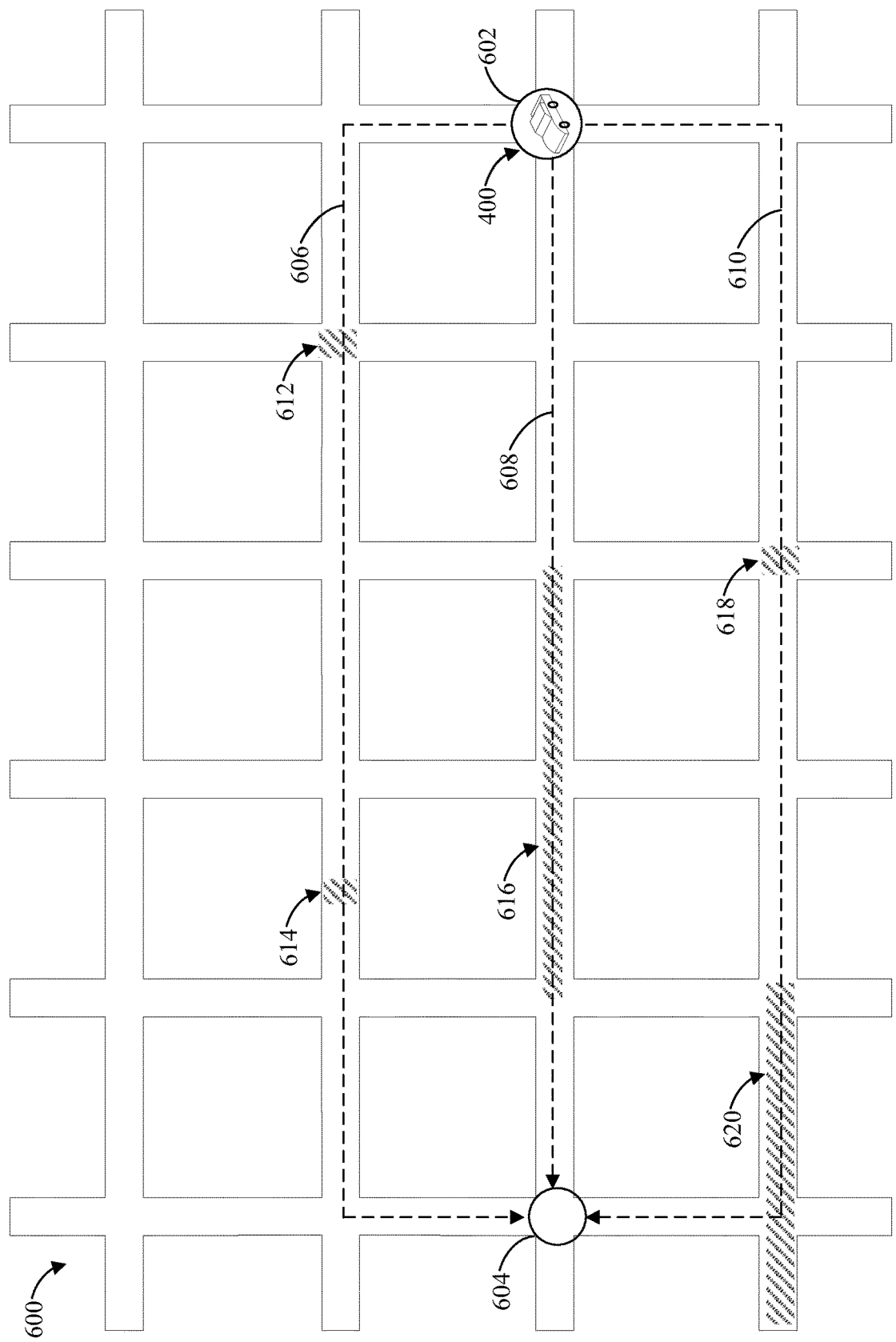
FIG. 6 illustrates an exemplary driving environment of an autonomous vehicle.

With reference now to FIG. 6, illustrated is an example embodiment of operation of the systems and methods described above. An exemplary driving environment 600 is illustrated. The driving environment 600 includes the autonomous vehicle 400 described above. It is contemplated that the autonomous vehicle 400 is initially located at an origin location 602 in the driving environment 600. Furthermore, it is contemplated that the autonomous vehicle 400 is to traverse the driving environment 600 such that the autonomous vehicle 400 arrives at the destination location 604. The computing system 300 and/or the computing system 414 of the autonomous vehicle 400 may receive information specifying the origin location 602 and/or the destination location 604. In one embodiment, the information may be from a computing device operated by a passenger (or future passenger) of the autonomous vehicle 400. In another embodiment, the information may be supplied by another source, such as a server computing system indicating that an autonomous vehicle is being recalled to a specified recall building and/or an autonomous vehicle is being dispatched to location where future demand is anticipated. The information for the origin location 602 and the information for the destination location 604 may be supplied by the same source or can vary.

In an example, information specifying the origin location 602 and/or the destination location 604 may include GPS coordinates. In another example, information specifying the origin location 602 and/or the destination location 604 may include street addresses, intersections, points of interest, or the like.

The routing application 306 of the computing system 300 and/or the routing application 500 of the autonomous vehicle 400 generates one or more candidate routes from the origin location 602 to the destination location 604. For instance, the illustrated embodiment includes a first candidate route 606 from the origin location 602 to the destination location 604, a second candidate route 608 from the origin location 602 to the destination location 604, and a third candidate route 610 from the origin location 602 to the destination location 604 (collectively referred to herein as candidate routes 606-610). Each of candidate routes 606-610 may include one or more third-party regions along route. In one embodiment, the third-party region comprises a predicted geographic region a disruptive third-party vehicle is likely to be traveling through at a similar time as the autonomous vehicle 400. In another embodiment, the third-party region could represent a computed likelihood that a disruptive third-party vehicle would be traveling through that region at a similar time as the autonomous vehicle 400. In a further embodiment, the third-party region could represent a computed likelihood that a disruptive third-party vehicle would be traveling through that region at various times, which may include but is not limited to a similar time as the autonomous vehicle 400. The third-party region can comprise any information suitable for routing an autonomous vehicle 400 using the technologies described herein, e.g. it may be a combination of the embodiments described above.

Third-party regions along a candidate route can be considered when identifying a route for the autonomous vehicle 400 and/or the third-party regions considered may be limited. For instance, the third-party regions considered may be limited based on score. A minimum threshold score for a third-party region may be required for the region to be considered. In another example, the third-party regions considered may be limited based on a size of the region. A minimum amount of interaction with the third-party vehicle may be required for the region to be considered. In a further example, the third-party regions considered may be limited based on the type of behavior associated with the third-party region. In a yet further example, the third-party regions considered may be limited based on a predicted impact of the behavior of the third-party vehicle will have on operation of the autonomous vehicle 400

As illustrated, the first candidate route 606 can include a first third-party region 612 and a second third-party region 614 that the autonomous vehicle 400 will travel through when the autonomous vehicle 400 follows the first candidate route 606. The second candidate route 608 can include a third third-party region 616 that the autonomous vehicle 400 will travel through when the autonomous vehicle 400 follows the second candidate route 608. The third candidate route 610 can include a fourth third-party region 618 and a fifth third-party region 620 that the autonomous vehicle 400 will travel through when the autonomous vehicle 400 follows the third candidate route 610. As is illustrated in FIG. 6, the candidate routes 606-610 may vary in length. For instance, the first candidate route 606 may be a longer travel distance from the origin location 602 to the destination location 604 than the second candidate route 608.

Collectively the third-party regions are referred to herein as third-party regions 612-620. Each of the third-party regions 612-620 may have associated therewith a score. As described above, the score may be indicative of a likelihood that a disruptive third-party vehicle will be traveling through a geographic location along the candidate route at a certain time. The third-party region may also have associated therewith information indicative of the behavior associated the third-party vehicle. Each of the illustrated third-party regions 612-620 may indicate a different behavior and/or behavior may be similar for one or more of the third-party regions 612-620. For instance, the first third-party region 612 can indicate a region where a third-party vehicle has been observed repeatedly running a yellow light. By comparison, the third third-party region 616 can indicate a region where a bus makes pickups and/or drop-offs.

The routing application 306 of the computing system 300 and/or the routing application 500 of the autonomous vehicle 400 can then identify a route from amongst the candidate routes 606-610 for the autonomous vehicle 400 to take from the origin location 602 to the destination location 604. Any suitable method may be used for identifying the route. For instance, a weighted directed graph may be generated and a shortest path through the weighted directed graph may be determined by routing application 306 of the computing system 300 and/or the routing application 500 of the autonomous vehicle 400. A first weighted directed graph can include weights that are indicative of a cost (e.g., a time cost, a distance cost, etc.) to the autonomous vehicle 400 in selecting a route that passes a third-party region in the third-party regions 612-620. A second weighted directed graph includes the weights from the first weighted directed graph modified based upon one or more scores (described above) output by the computer-implemented model 112 and/or the computer-implemented model 506. For instance, a modified weight may be based upon both travel time (or a travel distance) cost assigned to second candidate route 608 as well as a likelihood that third-party vehicle will be present in the third third-party region 616 and/or an impact presence of the third-party vehicle would have on operation of the autonomous vehicle 400. The routing application 306 of the computing system 300 and/or the routing application 500 of the autonomous vehicle 400 may determine the shortest path through the graph by applying a shortest path algorithm to the second weighted directed graph. For instance, the shortest path algorithm may be one of a Dijkstra's algorithm, a Bellman-Ford algorithm, or a Floyd-Warshall algorithm The shortest path may correspond to a candidate route that may not be the shortest route (from a time or a distance perspective) in the driving environment 600. Rather routing application 306 and/or the routing application 506 may have identified the route that has the lowest cost to the autonomous vehicle 400 when likelihood of presence of the third-party vehicle is additionally considered along with travel time or travel distance of the autonomous vehicle 400. The autonomous vehicle 400 may control at least one of the vehicle propulsion system 408, the braking system 410, or the steering system 412 such that the autonomous vehicle 400 follows the identified route from the origin location 602 to the destination location 604.

Figure 7:
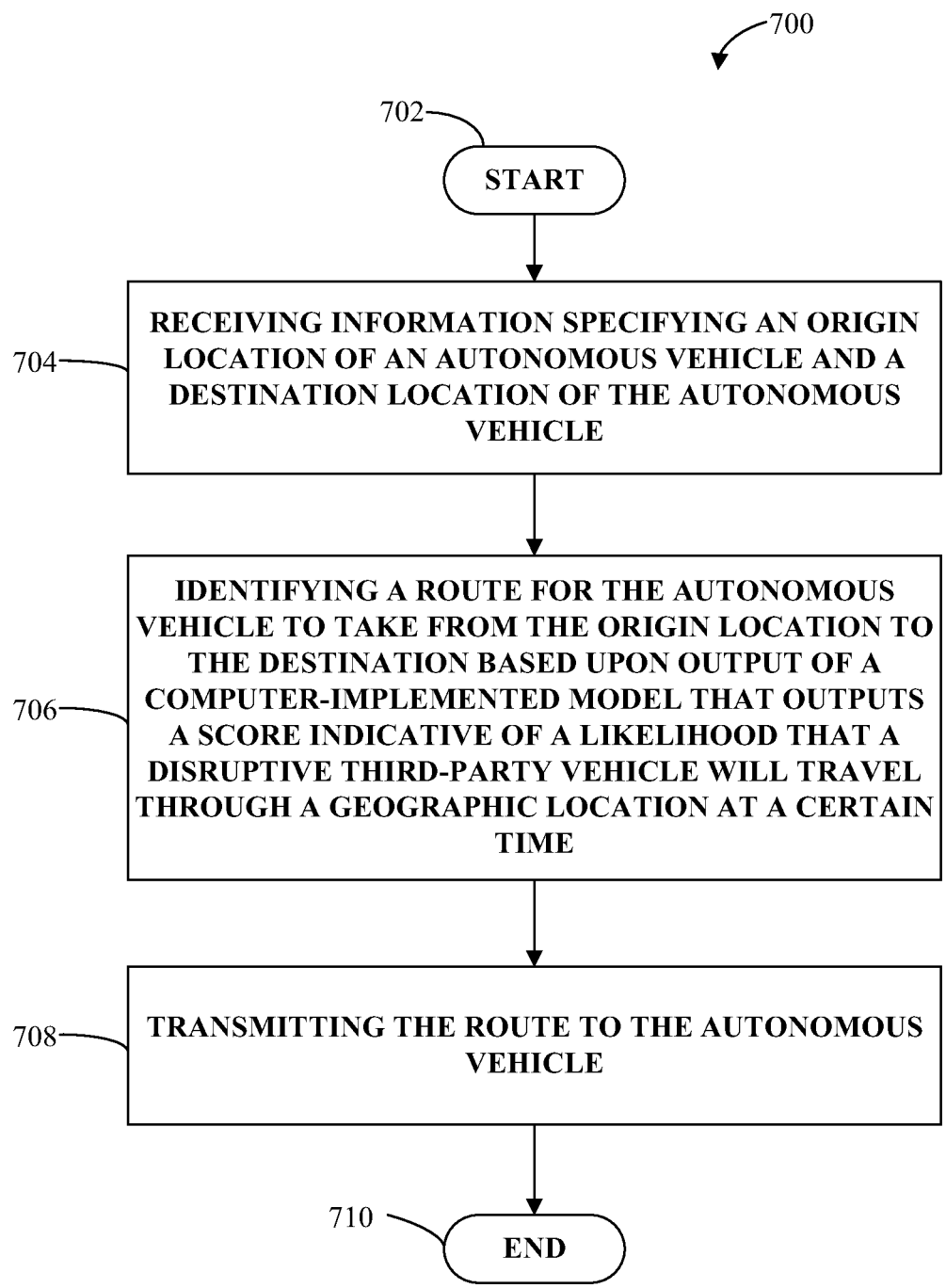
FIG. 7 is a flow diagram that illustrates an exemplary methodology executed by computing system for identifying a route for an autonomous vehicle to take from an origin location to a destination location.

FIG. 7 illustrates an exemplary methodology relating to selecting a route for an autonomous vehicle to follow based on predicted locations of disruptive third-party vehicles. While the methodology is shown as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium displayed on a display device, and/or the like.

Referring now to FIG. 7 an exemplary methodology 700 for selecting a route for an autonomous vehicle is illustrated. The methodology 700 starts at 702, and at 704, a computing system receives information specifying an origin location of the autonomous vehicle and a destination location of the autonomous vehicle. At 706, responsive to receiving the request, the computing system identifies a route for the autonomous vehicle to take from the origin location to the destination location based upon output of a computer-implemented model. The route may be identified from amongst a plurality of candidate routes. The computer-implemented model may be generated based upon labeled data that is indicative of observed instances of a disruptive third-party vehicle exhibiting behavior that impacts operation of an autonomous vehicle. The output of the computer-implemented model may be a score that is indicative of a likelihood that the disruptive third-party vehicle will be traveling through a geographic location along the candidate route at a certain time. The score may then be used in part to identify the route from amongst the candidate routes. At 708, the computing system transmits the route to the autonomous vehicle. The autonomous vehicle can then travel along the route from the origin location to the destination location. The methodology 700 concludes at 710.

The behavior of the disruptive third-party vehicle can include any behavior that may impact operation of an autonomous vehicle. For instance, the behavior can include traveling a threshold velocity above a speed limit for a geographic region (e.g., speeding). In another example, the behavior can include a threshold number of direction change rates above a second threshold (e.g., swerving). In a further example, the behavior can include repeated stopping to drop off or receive a person or an item for a trip of the disruptive third-party vehicle (e.g., a bus and/or a mail truck making deliveries and/or pickups).

In an embodiment of the methodology 700, a fleet of autonomous vehicles can observe instances of the disruptive third-party vehicle. The autonomous vehicle can be in this fleet of autonomous vehicles.

Figure 8:
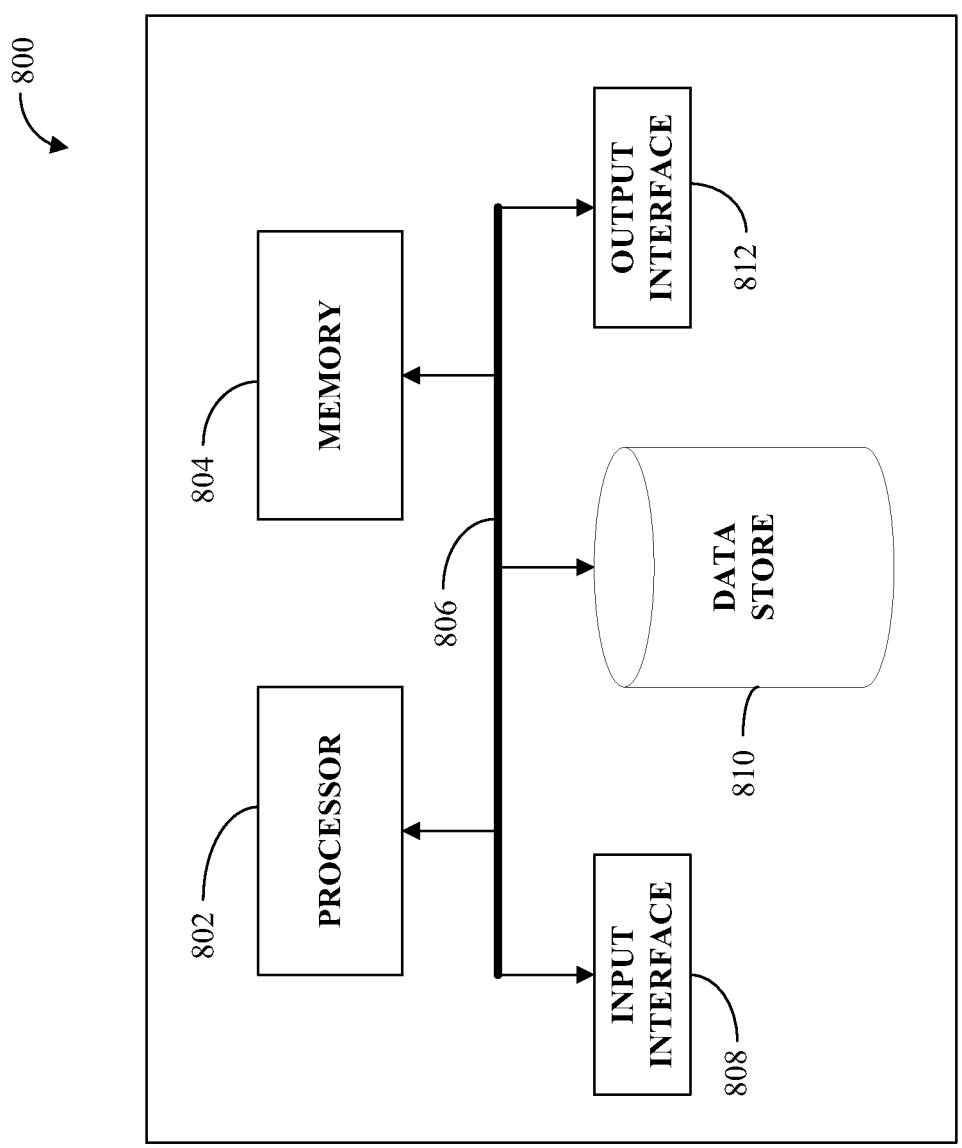
FIG. 8 illustrates an exemplary computing system.

Referring now to FIG. 8, a high-level illustration of an exemplary computing device that can be used in accordance with the systems and methodologies disclosed herein is illustrated. For instance, the computing device 800 may be or include the mobile computing device or the computing system. The computing device 800 includes at least one processor 802 that executes instructions that are stored in a memory 804. The instructions may be, for instance, instructions for implementing functionality described as being carried out by one or more components discussed above or instructions for implementing one or more methods described above. The processor 802 may be a GPU, a plurality of GPUs, a CPU, a plurality of CPUs, a multi-core processor, etc. The processor 802 may access the memory 804 by way of a system bus 806. In addition to storing executable instructions, the memory 804 may also store labeled data, computer-implemented models, map data, etc.

The computing device 800 additionally includes a data store 810 that is accessible by the processor 802 by way of the system bus 806. The data store 810 may include executable instructions, labeled data, computer-implemented models, map data, etc. The computing device 800 also includes an input interface 808 that allows external devices to communicate with the computing device 800. For instance, the input interface 808 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

As described herein, one aspect of the present technology is the gathering and use of data available from various sources to improve quality and experience. The present disclosure contemplates that in some instances, this gathered data may include personal information that uniquely identifies or can be used to contact or locate a specific person. Examples of such personal information can include location-based data, telephone numbers, and/or home addresses. The present disclosure contemplates that the entities responsible for the collection, analysis, disclosure, transfer, storage, or other use of such personal information would comply with well-established privacy policies and/or privacy practices. In particular, such entities should implement and consistently use privacy policies and practices that are recognized as meeting or exceeding industry or governmental requirements for maintaining privacy and security of personal information. Moreover, it is the intent of the present disclosure that personal information should be managed and handled in a way to minimize risks of unintentional or unauthorized access or use. Although the present disclosure broadly covers the use of personal information to implement one or more various disclosed embodiments, the present disclosure also contemplates that the various embodiments may also be implemented without the need for accessing all or a portion of such personal information.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system comprising:
 a processor; and
 memory that stores computer-executable instructions that, when executed by the processor, cause the processor to perform acts comprising:
  receiving information specifying an origin location of an autonomous vehicle and a destination location of the autonomous vehicle;
  responsive to receiving a request, identifying a route for the autonomous vehicle to take from the origin location to the destination location based upon output of a computer-implemented model, wherein the computing system identifies the route from amongst a plurality of candidate routes, wherein the computer-implemented model is generated based upon labeled data that is indicative of previously observed instances of a specific disruptive third-party vehicle exhibiting behavior that impacts operation of one or more autonomous vehicles in a fleet of autonomous vehicles, wherein the previously observed instances of the specific disruptive third-party vehicle were made by the autonomous vehicles in the fleet of autonomous vehicles, wherein the autonomous vehicle is in the fleet of autonomous vehicles, wherein the output of the computer-implemented model is a score that is indicative of a likelihood that the specific disruptive third-party vehicle will be traveling through a geographic location along a candidate route in the plurality of candidate routes at a certain time, wherein the likelihood is further based on a differing autonomous vehicle in the fleet of autonomous vehicles observing the specific disruptive third-party vehicle at a second geographic location, wherein the score is used in part to identify the route from amongst the plurality of candidate routes; and causing the autonomous vehicle to travel along the route from the origin location to the destination location.

2. The computing system of claim 1, wherein the behavior of the specific disruptive third-party vehicle includes traveling at a speed above a threshold speed for a geographic location.

3. The computing system of claim 1, wherein the behavior of the specific disruptive third-party vehicle includes a number of lane changes above a threshold number of lane changes during a period of time.

4. The computing system of claim 1, wherein the behavior of the specific disruptive third-party vehicle includes repeated stopping to at least one of drop off a passenger, pick up a passenger, drop off an item, or pick up an item for a trip of the specific disruptive third-party vehicle.

5. The computing system of claim 1, wherein the route from the plurality of candidate routes is further identified based on a predefined route of a second disruptive third-party vehicle.

6. The computing system of claim 1, wherein the computer-implemented model is one of:
a mixed model;
a Bayesian hierarchical model;
a random forest model; or
a neural network.

7. The computing system of claim 1, the acts further comprising:
prior to identifying the route for the autonomous vehicle to follow from the origin location to the destination location based upon the output from the computer-implemented model, receiving the labeled data; and
generating the computer-implemented model based on the labeled data.

8. The computing system of claim 1, wherein the autonomous vehicle comprises the computing system, wherein the autonomous vehicle further comprises:
a vehicle propulsion system;
a braking system; and
a steering system;
wherein the autonomous vehicle controls at least one of the vehicle propulsion system, the braking system, or the steering system in order to travel along the route from the origin location to the destination location.

9. The computing system of claim 1, wherein the candidate routes are selected based on travel time from the origin location to the destination location, wherein the identified route is selected based on the likelihood the autonomous vehicle will travel through a geographic location at the same time the specific disruptive third-party vehicle travels through the geographic location.

10. A method executed by a processor of a computing system, the method comprising:
receiving information specifying an origin location of an autonomous vehicle and a destination location of the autonomous vehicle;
responsive to receiving a request, identifying a route for the autonomous vehicle to take from the origin location to the destination location based upon output of a computer-implemented model, wherein the computing system identifies the route from amongst a plurality of candidate routes, wherein the computer-implemented model is generated based upon labeled data that is indicative of previously observed instances of a specific disruptive third-party vehicle exhibiting behavior that impacts operation of one or more autonomous vehicles in a fleet of autonomous vehicles, wherein the previously observed instances of the specific disruptive third-party vehicle were made by the autonomous vehicles in the fleet of autonomous vehicles, wherein the autonomous vehicle is in the fleet of autonomous vehicles, wherein the output of the computer-implemented model is a score that is indicative of a likelihood that the specific disruptive third-party vehicle will be traveling through a geographic location along a candidate route in the plurality of candidate routes at a certain time, wherein the likelihood is further based on a differing autonomous vehicle in the fleet of autonomous vehicles observing the specific disruptive third-party vehicle at a second geographic location, wherein the score is used in part to identify the route from amongst the candidate routes; and
transmitting the route to the autonomous vehicle, wherein the autonomous vehicle travels along the route from the origin location to the destination location.

11. The method of claim 10, wherein the behavior of the specific disruptive third-party vehicle includes traveling at a speed above a threshold speed for a geographic location.

12. The method of claim 10, wherein the behavior of the specific disruptive third-party vehicle includes a number of lane changes above a threshold number of lane changes during a period of time.

13. The method of claim 10, wherein the behavior of the specific disruptive third-party vehicle includes repeated stopping to at least one of drop off a passenger, pick up a passenger, drop off an item, or pick up an item for a trip of the specific disruptive third-party vehicle.

14. The method of claim 10, wherein the route from the plurality of candidate routes is further identified based on a predefined route of a second disruptive third-party vehicle.

15. The method of claim 10, further comprising:
prior to identifying the route for the autonomous vehicle to follow from the origin location to the destination location based upon the output from the computer-implemented model, receiving the labeled data; and
generating the computer-implemented model based on the labeled data.

16. An autonomous vehicle comprising:
a vehicle propulsion system;
a braking system;
a steering system; and
a computing system that is in communication with the vehicle propulsion system, the braking system, and the steering system, wherein the computing system comprises:
a processor; and
memory that stores computer-executable instructions that, when executed by the processor, cause the processor to perform acts comprising:
receiving information specifying an origin location of an autonomous vehicle and a destination location of the autonomous vehicle;
responsive to receiving a request, identifying a route for the autonomous vehicle to take from the origin location to the destination location based upon output of a computer-implemented model, wherein the computing system identifies the route from amongst a plurality of candidate routes, wherein the computer-implemented model is generated based upon labeled data that is indicative of previously observed instances of a specific disruptive third-party vehicle exhibiting behavior that impacts operation of one or more autonomous vehicles in a fleet of autonomous vehicles, wherein the previously observed instances of the specific disruptive third-party vehicle were made by the autonomous vehicles in the fleet of autonomous vehicles, wherein the autonomous vehicle is in the fleet of autonomous vehicles, wherein the output of the computer-implemented model is a score that is indicative of a likelihood that the disruptive third-party vehicle will be traveling through a geographic location along a candidate route in the plurality of candidate routes at a certain time, wherein the likelihood is further based on a differing autonomous vehicle in the fleet of autonomous vehicles observing the specific disruptive third-party vehicle at a second geographic location, wherein the score is used in part to identify the route from amongst the plurality of candidate routes; and controlling at least one of the vehicle propulsion system, the braking system, or the steering system to cause the autonomous vehicle to follow the route from the origin location to the destination location.

17. The autonomous vehicle of claim 16, wherein the behavior of the specific disruptive third-party vehicle includes at least one of:

traveling at a speed above a first threshold speed for a geographic location;

traveling at a speed below a second threshold speed for the geographic location;

a number of lane changes above a threshold number of lane changes during a period of time; or repeated stopping to at least one of drop off a passenger, pick up a passenger, drop off an item, or pick up an item for a trip of the specific disruptive third-party vehicle.

18. The autonomous vehicle of claim 16, wherein the autonomous vehicle further comprises sensor systems that generate sensor data indicative of a driving environment surrounding the autonomous vehicle, wherein the autonomous vehicle utilizes the sensor data in following the route from the origin location to the destination location.

19. The autonomous vehicle of claim 16, wherein the candidate routes are selected based on travel time from the origin location to the destination location, wherein the identified route is selected based on the likelihood the autonomous vehicle will travel through a geographic location at the same time the specific disruptive third-party vehicle travels through the geographic location.

20. The autonomous vehicle of claim 16, wherein the route from the plurality of candidate routes is further identified based on a predefined route of a second disruptive third-party vehicle.

\* \* \* \* \*